June 27, 1961 W. F. STAHL 2,989,785
METHOD OF FORMING PLASTIC CONTAINERS
Filed June 25, 1959
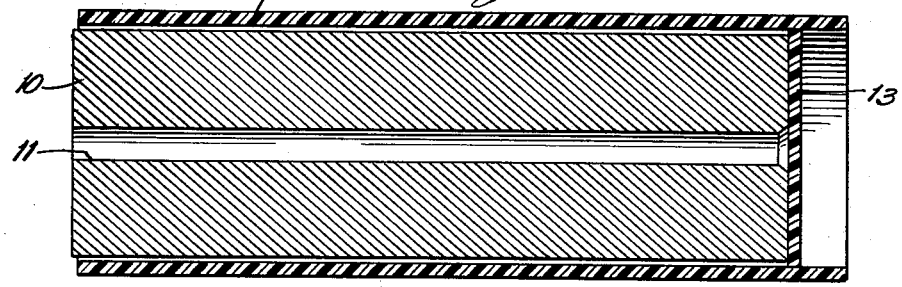
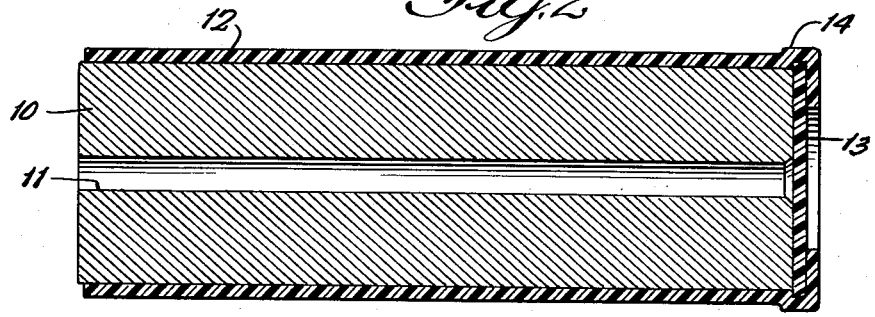
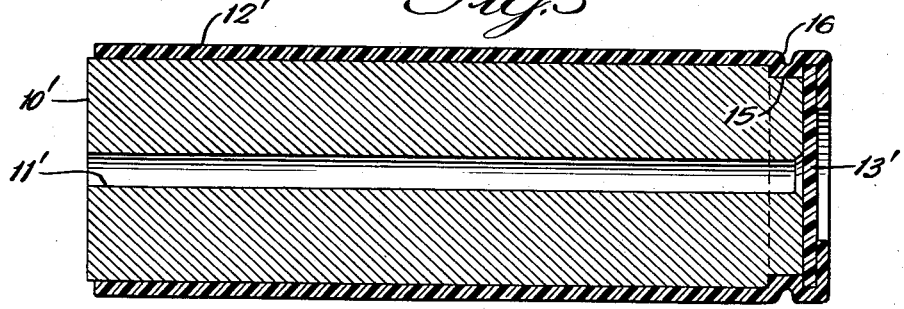
INVENTOR:
William F. Stahl,
BY Dawson, Tilton, Fallon & Lungmus,
ATTORNEYS.

United States Patent Office 2,989,785
Patented June 27, 1961

2,989,785
METHOD OF FORMING PLASTIC CONTAINERS
William F. Stahl, 423 Abbottsford Road, Kenilworth, Ill.
Filed June 25, 1959, Ser. No. 822,936
12 Claims. (Cl. 18—59)

This invention relates to a method of forming containers from plastic materials capable of shrinking upon the application of heat.

One of the principal objects of the present invention is to provide a simple and highly effective method for making containers from tubular plastic stock, the method utilizing the shrinking properties of the plastic in the formation of the containers. Another object is to provide an inexpensive and fast method for forming containers from a selected plastic material, or from a combination of such materials, so that the finished article will have all of the desirable electrical properties and other physical properties of the material or materials from which it is formed. Other objects will appear from the specification and drawings in which:

FIGURE 1 is a longitudinal sectional view of a tube and disc supported by a mandrel in a preliminary stage in the formation of a plastic container;

FIGURE 2 is a longitudinal sectional view similar to FIGURE 1 but showing the tube after it has been treated and shrunk in a later stage of container formation; and FIGURE 3 is a longitudinal sectional view of a plastic tube shrunk upon a mandrel and illustrating a modification of the method of container formation.

One aspect of the present invention lies in the recognition that tubular plastic materials may become oriented during the extrusion process by which they are formed so that they will shrink upon the later application of heat, and that such a property of oriented plastic tubes may be utilized in the formation of plastic containers. Thus, it has been found that extruded tubes formed from oriented Mylar (polyglycol terephthalate manfactured and sold by E. I. du Pont de Nemours & Co., Inc., Wilmington, Delaware) will, upon the application of heat, undergo a molecular reorientation and in so doing will shrink to form a tube of smaller internal and external diameter. Other plastic materials capable of shrinking upon the application of heat might also be used. For example, a tube formed from oriented polystyrene will also shrink when subjected to heat and may be used effectively in connection with the method of the present invention.

More specifically, the method of this invention involves closing the end of a plastic tube to form a container by shrinking an end portion of that tube about a dimensionally stable closure element. The method thereby utilizes a physical change in the tubular member at elevated temperatures to provide a physical and extremely secure connection between that member and an element which is dimensionally stable at the higher temperature. However, it is to be understood that the physical connection between the parts might also be accompanied by fusion should the stable and unstable elements be heat sealing at the temperature required for the shrinking of the tube.

For practicing my invention, I provide a mandrel or arbor 10 which may be of substantially uniform diameter, as illustrated in FIGURES 1 and 2, and which has an axial passage 11 extending therethrough. The mandrel is rigidly connected at one end to any suitable supporting structure (not shown) and passage 11 communicates with a pump or other suitable device (not shown) for withdrawing air therefrom.

In the first step of the method, a section of oriented plastic tubing 12 which is capable of shrinking upon the application of heat is placed upon the mandrel 10. From FIGURE 1, it will be seen that the internal diameter of tube 12 is substantially greater than the external diameter of mandrel 10. The tube is positioned upon the mandrel so that one end of the oriented plastic tube extends beyond the end of the mandrel a distance substantially greater than the wall thickness of the tube but less than the diameter of the mandrel.

Thereafter, a disc 13 of dimensionally stable material is inserted into the open end of tube 12 and is placed or drawn against the free end of the mandrel. The disc has a diameter greater than the diameter of the mandrel but less than the internal diameter of tube 12. It may be formed from metal, paper, board material, or any suitable plastic material as long as such material is dimensionally stable at the shrinking temperature of tube 12. Thus, the disc may be formed from the same plastic material as tube 12 as long as the plastic of the disc is unoriented and will not shrink at the temperature which causes shrinking of the cylindrical tube.

The drawing of a partial vacuum has been found to be a particularly effective way of holding disc 13 in place upon the end of mandrel 10. The withdrawing of air from passage 11 also assists in pulling (or pushing by atmospheric pressure) the disc into the projecting end of the open tube and, if desired, mechanical means (not shown) may be provided for positioning and inserting the discs, such means acting in conjunction with the suction effect already described.

After the disc has been positioned against the mandrel's free end, tube 12 is heated to cause molecular disorientation and shrinking of that tube into the condition illustrated in FIGURE 2. This may be accomplished by emersing the mandrel and the tube supported thereby into a bath of heated mercury or other suitable liquid which will not boil or evaporate excessively at tube shrinking temperatures. An especially effective method for heating tube 12 consists of directing a stream of hot air over the tube until it has shrunk into surface contact with the supporting mandrel. Shrinking has also been successfully achieved by open gas flames converging at a central point through which the mandrel is rapidly passed, or by an electric heating coil spaced about the mandrel. It is important that the tube be heated uniformly since, if one side reaches shrinking temperature first, the uneven shrinking will cause permanent distortion or wrinkles. While the precise temperature to which the tube is heated depends upon the character of the plastic material of which it is formed, it has been found that when the tube is made of oriented Mylar a shrinking temperature in the range of approximately 350–450° F. is effective and, in the case of a tube formed from oriented polystyrene, a temperature within the range of 185° to 250° F. might be used.

When heated to shrinking temperature, the end portion of tube 12 which projects beyond disc 13 shrinks and bends inwardly into surface contact with the outer face of the disc. Since the disc is of greater diameter than the mandrel, the tube also shrinks into peripheral surface contact with the inner face of the disc, thereby firmly locking the disc against axial movement with respect to the tube 12. The result is a plastic container having a base 13 securely interlocked to one end of a cylindrical plastic body 12. The container may be removed from the mandrel by any suitable means and, if desired, the flow of air in passage 11 may be reversed to assist in such removal.

It will be noted that the container illustrated in FIGURE 2 has an annular and external enlargement 14 about its base caused by disc 13 which prevents full shrinkage of tube 12 in that area or zone. Since the presence of such an enlargement or bead might be objectionable in some instances, I provide an alternative method for forming a container without such an enlargement, as indicated in FIGURE 3 of the drawings. The equipment, materials and procedural steps are identical to what has been already described except that mandrel 10' is provided with an external annular indentation 15 at its free end. Disc 13' has a diameter greater than the diameter of the reduced end portion of the mandrel and preferably the same or less than the diameter of the remainder of the mandrel. Thus, when tube 12' is heated and shrinks into circumferential surface contact with the mandrel, a portion 16 of that tube shrinks into the annular space 15 to form an internal shoulder for locking the base disc 15 against axial movement with reference to the tubular body without at the same time, producing the external enlargement 14 in the previous embodiment.

*Example I*

Two inch sections of tubing having inside diameters of 0.255 inch and having wall thicknesses ranging between 2 to 10 mills were placed upon hollow mandrels having 0.250 inch outside diameters. The tubes were formed of oriented Mylar ("Mylar" is a trade designation for polyglycol terephthalate manufactured and sold by E. I. du Pont de Nemours & Co., Wilmington, Del.). Disc caps of various materials (metals and unoriented Mylar) and having diameters of 0.255 inch were inserted into the open ends of the tubes projecting beyond the ends of the mandrels and were held in place by partially evacuating the air from the mandrel passages. The tubes were then heated to approximately 375° F. by emersing the same in a heated mercury bath. After cooling, the tubes and caps were withdrawn from the mandrels, the tubing having shrunk to inside diameters of approximately 0.250 inch and the caps being firmly locked in place within the ends of the tubes.

*Example II*

The procedure set forth in Example I was followed except that the oriented Mylar tubes were heated to shrinking temperatures by each of the following methods: (1) subjecting a tube, supported by a mandrel, to a blast of heated air; (2) passing the end of a mandrel supporting a tube through the central area defined by a series of converging gas flames; (3) inserting the tube and mandrel end into the cylindrical space within an electric heating coil. Shrinkage of the tubes and secure interlocking with the caps was achieved in all cases. However, rotation of the mandrels and tubes during heating by procedures (1) and (2) was found helpful in avoiding wrinkles in the tube surfaces that might otherwise be caused by uneven shrinking.

*Example III*

The procedures set forth in Examples 1 and 2 were carried out using thermoplastic polystyrene tubing. Upon heating to temperatures of approximately 200° F., and cooling thereafter, the tubes were found to have shrunk into circumferential contact upon the mandrels and to have become tightly interlocked with the caps.

While in the foregoing I have disclosed two embodiments of the present invention in considerable detail for purposes of illustration, it will be understood by those skilled in the art that many of these details may be varied without departing from the spirit and scope of the invention.

I claim:

1. In a method of forming a plastic container of predetermined dimensions, the steps of placing a plastic tube upon a mandrel of selected diameter smaller than the tube's internal diameter, said tube being formed from an oriented plastic material capable of shrinking into circumferential contact with said mandrel upon the application of heat to form a tube of smaller predetermined size, positioning said tube so that one end thereof extends beyond the free end of said mandrel, inserting into said one end of said tube a dimensionally stable disc having a diameter greater than the external diameter of the mandrel, and thereafter heating said tube to shrink the same about said mandrel and said disc and thereby lock said disc against axial movement with reference to said tube.

2. The method of claim 1 in which said tube is heated by subjecting the same to a stream of heated air.

3. The method of claim 1 in which said tube is formed from oriented polyglycol terephthalate.

4. The method of claim 1 in which said tube is formed from oriented polystyrene.

5. A container forming method comprising the steps of positioning a plastic tube upon a mandrel of selected diameter with one end of said tube extending beyond the mandrel's free end, said tube having an internal diameter greater than the external diameter to said mandrel to provide a space therebetween, said tube being formed from a heat shrinkable plastic material and being capable of shrinking into circumferential surface contact with the mandrel upon the application of heat, inserting into said one end of said tube a dimensionally stable disc having a diameter greater than the external diameter of the mandrel's free end portion, said one end of said tube extending axially beyond said disc, and thereafter heating said plastic tube to shrink the same about said mandrel and said disc and thereby lock the disc within said tube.

6. A container forming method comprising the steps of positioning a plastic tube upon a mandrel of selected diameter with one end of said tube extending beyond the mandrel's free end, said mandrel having a passage extending therethrough and said tube having an internal diameter greater than the external diameter of said mandrel to provide a space therebetween, said tube being formed from a heat shrinkable plastic material and being capable of shrinking into circumferential surface contact with the mandrel upon the application of heat, inserting into said one end of said tube a dimensionally stable disc having a diameter greater than the external diameter of the mandrel's free end portion, withdrawing air from said passage to hold said disc against the free end of said mandrel, said one end of said tube extending axially beyond said disc, and thereafter heating said plastic tube to shrink the same about said mandrel and said disc and thereby lock the disc within said tube.

7. The method of claim 5 in which said plastic tube is heated by directing a stream of hot air over the external surface thereof.

8. The method of claim 5 in which said plastic tube is heated by inserting the same into the central space of an electric heating coil.

9. The method of claim 5 in which said plastic tube is heated by emersing the same into a bath of heated liquid.

10. The method of claim 5 in which said plastic tube is heated by passing the same through open flames.

11. In a method of forming an end-closed plastic container of predetermined internal diameter, the steps of positioning a plastic tube upon a mandrel with one end of said tube extending beyond the mandrel's free end, said mandrel being of selected external diameter substantially smaller than the inside diameter of said tube and corresponding with the desired internal diameter of said container, said tube being formed from a plastic material capable of shrinking upon appropriate treatment into circumferential surface contact with said mandrel, inserting into said one end of said tube a dimensionally stable disc having a diameter greater than the external diameter of the mandrel's free end portion, said one end of said tube extending axially beyond said disc, and thereafter treating said plastic tube to shrink the same until its internal diameter is substantially the same as the external diameter of said mandrel, thereby locking said disc within said tube and forming an end-closed container of preselected internal diameter.

12. The method of claim 11 in which there is the additional step of reversing the flow of air through the passage of said mandrel to remove said container therefrom.

References Cited in the file of this patent

UNITED STATES PATENTS

| | | |
|---|---|---|
| 2,396,712 | Luttge et al. | Mar. 19, 1946 |
| 2,821,155 | Seckel | Jan. 28, 1958 |

FOREIGN PATENTS

| | | |
|---|---|---|
| 426,788 | Great Britain | Apr. 5, 1935 |
| 752,221 | Great Britain | July 4, 1956 |